United States Patent

Schaefer

[15] 3,688,140
[45] Aug. 29, 1972

[54] LEAKAGE CONTROL MEANS FOR A SUBMERSIBLE MOTOR ASSEMBLY

[72] Inventor: Edward J. Schaefer, Bluffton, Ind.
[73] Assignee: Franklin Electric Co., Inc., Bluffton, Ind.
[22] Filed: Sept. 18, 1970
[21] Appl. No.: 73,442

[52] U.S. Cl. .................................................310/87
[51] Int. Cl. ..............................H02k 5/10, H02k 5/12
[58] Field of Search............................310/87–91; 417/228, 321, 410

[56] References Cited

UNITED STATES PATENTS

| | | | |
|---|---|---|---|
| 1,610,726 | 12/1926 | Arutunoff | 310/87 X |
| 2,291,248 | 7/1942 | Myers | 310/87 X |
| 2,369,440 | 2/1945 | Curtis | 310/87 X |
| 2,654,848 | 10/1953 | Schaefer | 310/87 X |
| 2,772,373 | 11/1956 | Howe | 310/87 X |
| 2,492,141 | 12/1949 | Gaylord | 310/87 |
| 2,423,436 | 7/1947 | Blom | 310/87 UX |
| 2,758,226 | 8/1956 | Fisher | 310/87 |
| 2,829,288 | 4/1958 | Schaefer | 310/87 |
| 1,925,334 | 9/1933 | Mendenhall et al. | 310/87 |
| 2,371,193 | 3/1945 | Sigmund et al. | 310/87 |
| 2,674,194 | 4/1954 | Arutunoff | 310/87 X |
| 2,600,277 | 6/1952 | Smith | 310/87 |
| 1,778,787 | 10/1930 | Arutunoff | 310/87 |
| 1,678,883 | 7/1928 | Steiner | 310/87 |
| 1,657,900 | 1/1928 | Richter | 310/87 |
| 1,750,818 | 3/1930 | Sauveur | 310/87 X |

*Primary Examiner*—J. D. Miller
*Assistant Examiner*—Mark O. Budd
*Attorney*—Hibben, Noyes & Bicknell

[57] ABSTRACT

The assembly includes a watertight enclosure which protects critical motor parts, such as the bearings and windings, from the water. The rotatable drive shaft of the motor extends out of the enclosure through an opening for connection with a device to be driven, and means is provided to control leakage of water into the enclosure through the opening around the shaft. The leakage control means comprises a rotating shaft seal between the margin of the opening and the shaft. Above the seal is a sump, and a pump is located within the sump, the pump being driven by rotation of the motor shaft. A liquid, either lubricant or accumulated leakage, contained in the sump is forced by the pump in the direction of the seal, and the pressure in the sump developed by the pump prevents additional leakage through the seal. Further, the pump pressure may force some of the leakage accumulated in the sump out of the enclosure through the seal.

14 Claims, 12 Drawing Figures

Inventor:—
Edward J. Schaefer,
By Hibben Noyes & Bicknell
Attys.

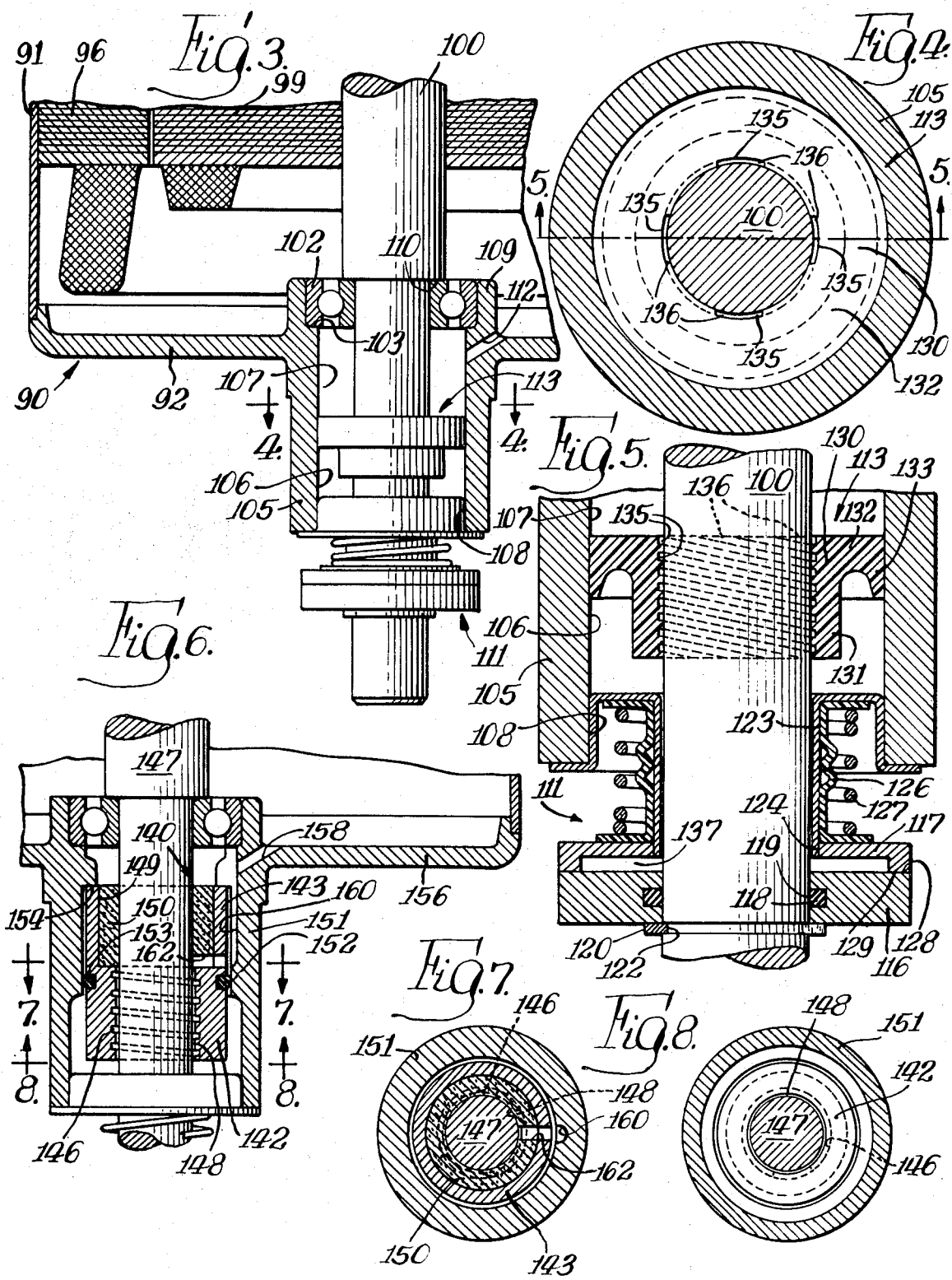

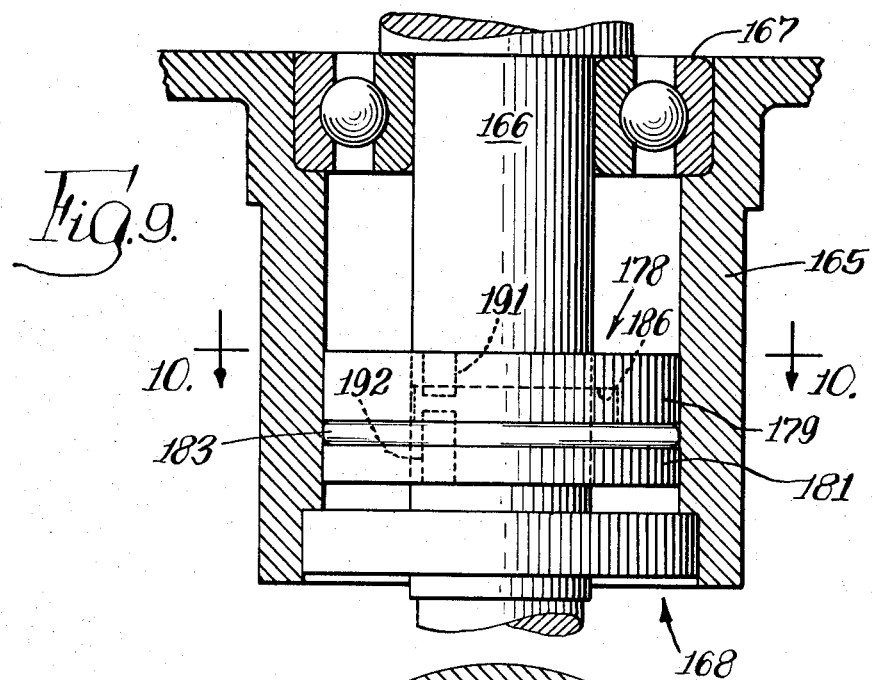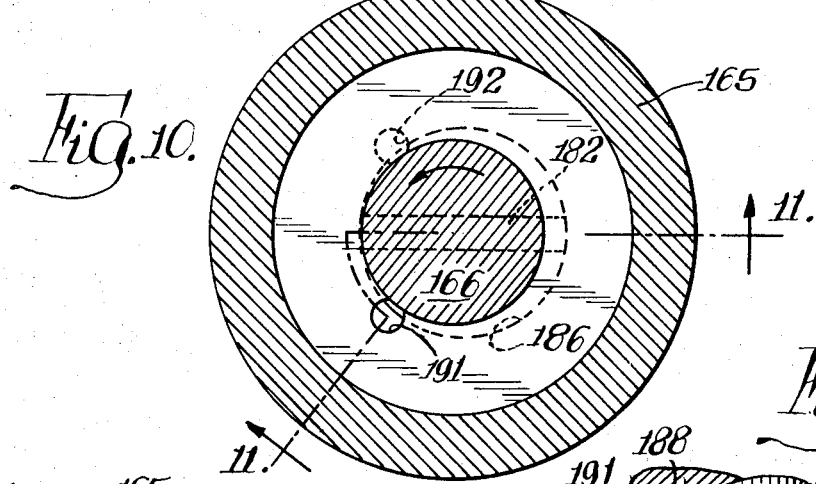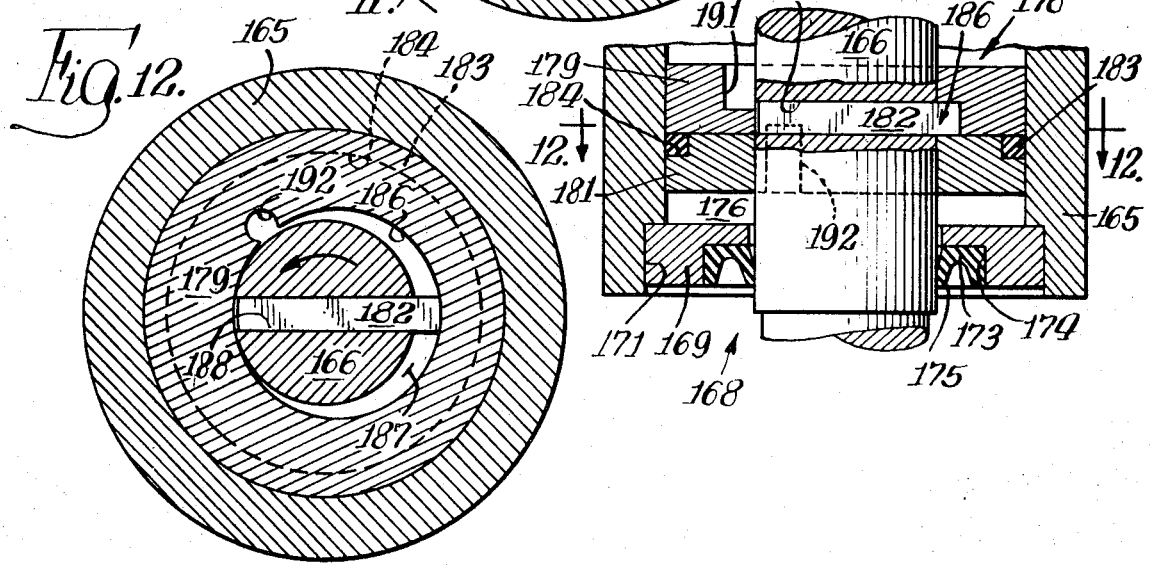

LEAKAGE CONTROL MEANS FOR A SUBMERSIBLE MOTOR ASSEMBLY

A submersible electric motor assembly such as that disclosed in E. J. Schaefer U. S. Pat. No. 3,246,186 includes a liquid tight enclosure around an electric motor, the enclosure protecting critical parts of the motor from a liquid in which the assembly may be submersed. The drive shaft of the motor extends out of the enclosure through an opening so that the shaft may be coupled to a device, such as a pump, to be driven. A seal is provided between the motor shaft and the enclosure to prevent the entrance of liquid into the enclosure through the opening around the shaft. Such assemblies have been widely and successfully used to drive sump pumps.

Such motors normally operate intermittently, and it has been found that there often is a small amount of leakage through the seal, such leakage usually occurring when the motor is running. While such leakage is small, over a period of time it may accumulate to the level where the liquid damages the bearings and other critical parts of the motor, causing failure of the motor.

In accordance with the present invention, such failure is prevented by providing, in addition to the foregoing components, means for developing a pressure on the inner side of the seal, such pressure counteracting the pressure of external liquid tending to leak inwardly through the seal, said means also expelling accumulated leakage, it if occurs, out of the enclosure. This means for developing such pressure is provided by a purge pump located within the enclosure inwardly of the seal and preferably driven by the rotating shaft of the motor. The enclosure may contain a liquid such as lubricant or leakage and is shaped to form a well or sump at the lower end thereof, and the purge pump is preferably located above the sump. Upon rotation of the motor shaft, the purge pump forces the liquid in the direction of the seal. The pump pressure prevents leakage into the enclosure through the seal, and the pressure may force a portion of the liquid out of the enclosure through the seal. The seal may be constructed such that it is more effective in sealing against leakage into the enclosure than in sealing against flow out of the enclosure, so that the purge pump may easily force accumulated leakage out of the enclosure through the seal.

Objects and advantages of the invention will be apparent from the following detailed description taken in conjunction with the accompanying figures of the drawing, wherein:

FIG. 3 is a fragmentary sectional view generally similar to a portion of FIG. 1 but showing another embodiment of the invention; one FIG. 4 is an enlarges sectional view taken on the line 4—4 of FIG. 3;

FIG. 5 is a fragmentary sectional view taken on the line 5—5 of FIG. 4;

FIG. 6 is a fragmentary sectional view generally similar to a portion of FIG. 1 but showing still another embodiment of the invention;

FIG. 7 is a fragmentary sectional view taken on the line 7—7 of FIG. 6;

FIG. 8 is a fragmentary sectional view taken on the line 8—8 of FIG. 6;

FIG. 9 is a fragmentary sectional view generally similar to a portion of FIG. 1 but showing yet another embodiment of the invention;

FIG. 10 is a fragmentary sectional view taken on the line 10—10 of FIG. 9;

FIG. 11 is a fragmentary sectional view taken on the line 11—11 of FIG. 10; and

FIG. 12 is a fragmentary sectional view taken on the line 12—12 of FIG. 11.

Figure 1:
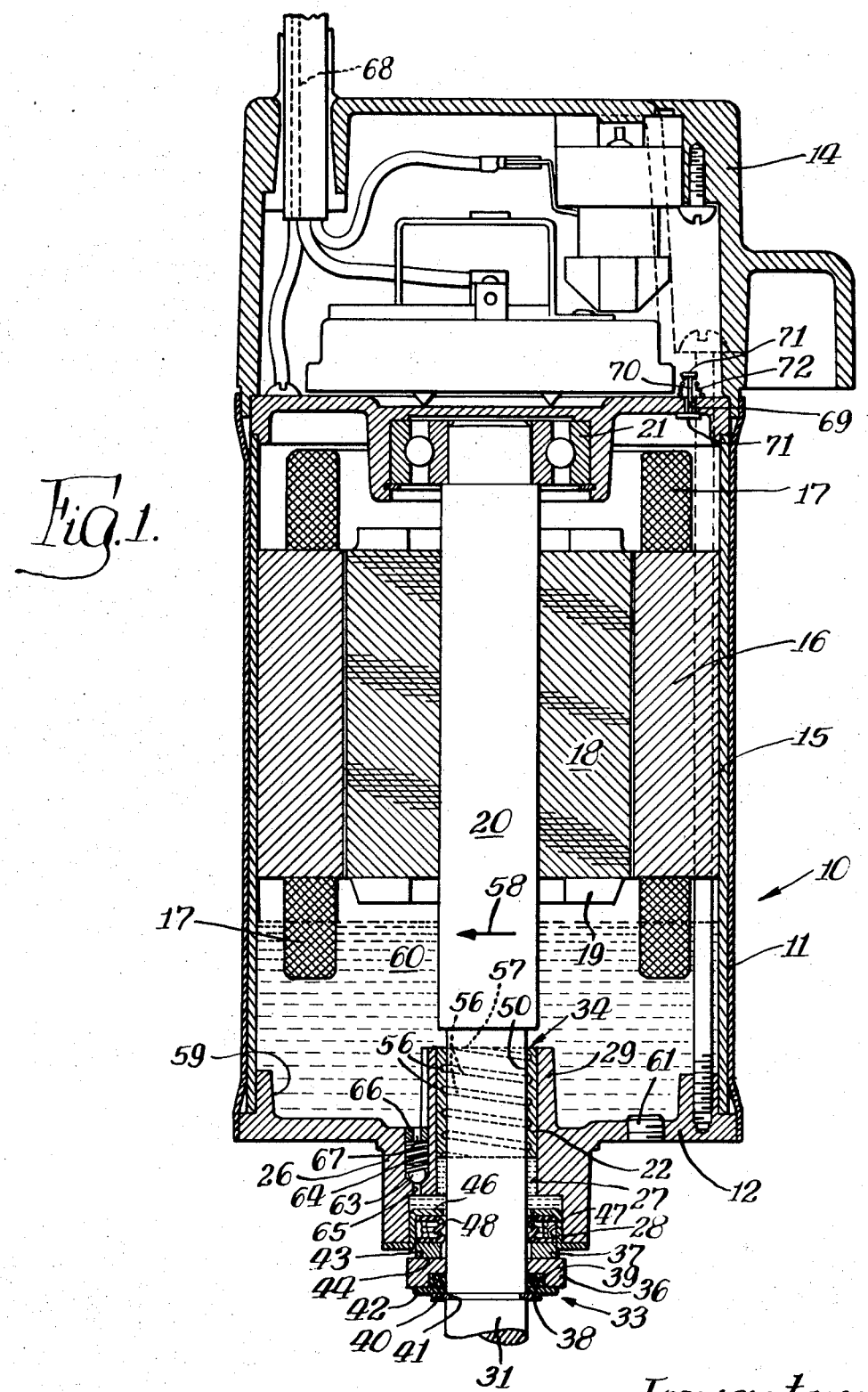
FIG. 1 is a vertical cross sectional view of an electric motor assembly embodying the invention.

The electric motor assembly illustrated in FIG. 1 comprises an enclosure or housing indicated generally at 10, which includes an outer cylindrical shell 11 and a lower end member 12. The upper end of the motor includes an upper end member 14 which encloses the top of the assembly, and the two end members and the cylindrical shell 11 are secured together to form an enclosure around the remaining parts of the motor. Such remaining parts comprise a stator including a stator core 16 and windings 17, the core 16 being secured to the inner periphery of a motor shell 15 which fits within the outer shell 11. A rotor including a rotor core 18, rotor windings 19, and a rotor or drive shaft 20 are positioned in a rotor cavity formed by the stator core 16. The rotor shaft 20 is rotatably supported on the upper and lower end members by an upper ball bearing 21 and by a tubular member or lower sleeve bearing 22, hereinafter described in detail. The motor may be turned on and off by any suitable means.

The central portion of the lower end member 12 extends downwardly forming a hub 26, the interior of the hub 26 forming a sump or well 27. The lower end of the hub 26 is open as illustrated at 28, and the shaft 20 extends downwardly through the hub 26 and out of the opening 28. The bearing 22 is fastened within the upwardly extending portion 29 of the lower end member 12. The lower end portion 31 of the rotor shaft 20 below the hub 26 may be connected, as by splines or a key, to a rotary device such as a pump to be driven by the motor.

As previously mentioned, the motor is designed for use while partially or entirely submersed in liquid, and a rotating shaft seal 33 and a purge pump 34, which is part of the bearing 22, are provided to control leakage of the liquid into the interior of the motor housing, through the opening 28 of the hub 26 around the shaft 20. The rotating shaft seal 33 comprises a ring-shaped rotating part 36 and a ring-shaped non-rotating part 37. The rotating part 36 is mounted on the rotor shaft 20 in close engagement therewith and is driven thereby. Packing 38 located in a groove 39 formed in the inner periphery of the part 36 forms a seal between the part 36 and the shaft 20. A snap ring 40 mounted in a groove 41 formed in the shaft 20 below the part 36 and abutting a washer 42 which in turn abuts the part 36 prevents downward movement of the rotating part 36. The upper radially extending surface of the rotating part 36 forms a seal face 43 which is engaged by an annular seal face 44 on the lower side of the non-rotating part 37. The non-rotating part 37 is slidably fastened to the lower end portion of the hub 26 by a support 46 which is attached to the hub 26 in sealing relation therewith. The support 46 has a radially extending flange abutting the lower surface of the hub 26, then it extends upwardly into the interior of the hub 26 in press fit relation therewith. It then extends radially inward toward and terminates closely adjacent the shaft 20. A tubular flexible member 48 has ends which are turned radially outward and are sealingly engaged with the support 46 and the upper face of the non-rotating part 37, thereby preventing leakage of liquid between the non-rotating part 37 and the support 46. A compression spring 47 is located between the outwardly turned ends of the member 48, holding these ends in sealing relation with the non-rotating part 37 and the support 46, as well as holding the faces 43 and 44 in tight engagement.

When the motor shaft 20 rotates, the rotating part 36 of the seal rotates with the shaft and the faces 43 and 44 of the two parts 36 and 37 are in sliding engagement.

The purge pump 34 is provided to assist in controlling leakage into the sump 27. While the purge pump may be driven either by the rotor shaft 20 or by separate means, it is preferred that it be driven by the shaft 20. In the preferred form of the invention illustrated in FIG. 1, the pump 34 is a viscosity type pump which is formed on the inner surface of the sleeve bearing 22. The bearing 22 is made of a suitable bearing material and has a bearing surface 50 which contacts the shaft 20 and locates the shaft 20 in the lower member 12. The pumping action of the pump 34 is due to a spiral groove which may be formed on either the shaft 20 or in the bearing 22. In the present instance, a groove 56 is formed on the inner surface of the bearing 22. As shown in FIG. 1, a single spiral groove is formed, it being understood that multiple grooves may be used. The groove 56 extends from the upper surface to the lower surface of the bearing 22. The groove 56 opens into the space above the pump 34 as indicated at 57 in FIG. 1 and also opens into the sump 27. Rotation of the shaft 20 in the direction of the arrow 58, as seen in FIG. 1, relative to the bearing 22 results in any liquid above the pump being drawn into the opening 57 and being pumped downwardly. Of course, if the motor were designed for operation in the opposite direction, the groove 56 would spiral in the opposite direction in order to pump the liquid downwardly.

As is shown in FIG. 1, the sump 27 and the interior of the enclosure 10, forming a chamber or reservoir 59, is filled with a liquid, such as a lubricant 60, to a lever above the pump 34 but below the rotor winding 19 by means of a fill plug 61 located in the lower end member 12. Raising the level of lubricant above the bottom of the rotor is undesirable since it would cause increased resistance to rotation and churning of the lubricant. The lubricant is lighter than water so that any water that leaks into the sump 27 past the seal 33 will accumulate in the lower portion of the sump.

Considering the operation of the structure illustrated in FIG. 1, the motor assembly is initially installed by coupling the lower end portion 31 of the rotor shaft 20 to a device, such as a pump, to be driven, and the motor assembly is supported with the shaft 20 rotating on a vertical axis. As previously mentioned, the motor is designed for use where at least the lower end portion thereof is partially or entirely submersed in liquid, or where the motor is at a location where water would tend to enter the motor. Rotation of the shaft 20 upon energization of the motor causes the lubricant 60 to be pumped downwardly. The pressure due to the pumping action on the lubricant 60 counteracts the pressure of the external liquid and thus prevents leakage of external liquid through the seal 33. The pump 34 should therefore be capable of developing greater pressure than the pressure of the external liquid.

In the event a small leakage of lubricant 60 from the sump 27 to the exterior of the seal 33 is developed due to the pressure developed by the pump 34, sufficient lubricant 60 is available in the reservoir 59 of the enclosure above pump 34 to permit operation of the motor for a period of many years. Should there be leakage of external liquid, such as water, into the sump 27 through the seal 33, the leakage would accumulate in the bottom of the sump 27 and would be expelled from the sump before any lubricant is expelled.

The proper pressure developed by the pump 34 may be achieved by the design of the size or pitch of the groove 56. Should additional control of the pressure be desired, a one-way valve may be provided to permit flow from the outlet side of the pump 34 in the sump 27 to the inlet side of the pump in the reservoir 59 when the pressure in the sump 27 exceeds a certain value. The one-way value comprises a ball 63 and a spring 64 contained in an enlarged portion of a passage 65 formed in the end member 12. The spring 64 holds the ball closed against one end of the enlarged chamber and is retained in the chamber by a plug 66 having an opening 67 therethrough.

Should the seal 33 leak lubricant 60 as heretofore mentioned, a slight vacuum may develop in the enclosure 10. In some applications the vacuum may be undesirable or permit leakage of external liquid into the sump 27 through the seal 33. Should it be desired to eliminate the vacuum, such result may be accomplished by providing a vent for the enclosure 10 to atmosphere. The vent may comprise an air passage 68, shown in dashed lines, formed in an electric cord located in the upper member 14. The interior of the upper end member 14 is connected to the interior of the shell 15 and the reservoir 59 in the lower end member 12 by an opening 69 formed in an end wall of the stator to permit air to enter the reservoir 59 to eliminate the vacuum.

To prevent leakage of lubricant 60 from the motor when it becomes inverted during handling, a check valve 70 may be provided to close the opening 69. The check valve 70 has enlarged ends 71, the lower end 71 sealing against the margin of the opening 69 to prevent lubricant 60 from leaving the reservoir 59. The other end 71 abuts a spring 72 which in turn abuts the wall of the stator and biases the valve 70 into a closed position. The valve 70 opens when vacuum is present within the motor shell 15 to permit air to enter the reservoir 59 and eliminate the vacuum.

Figure 2:
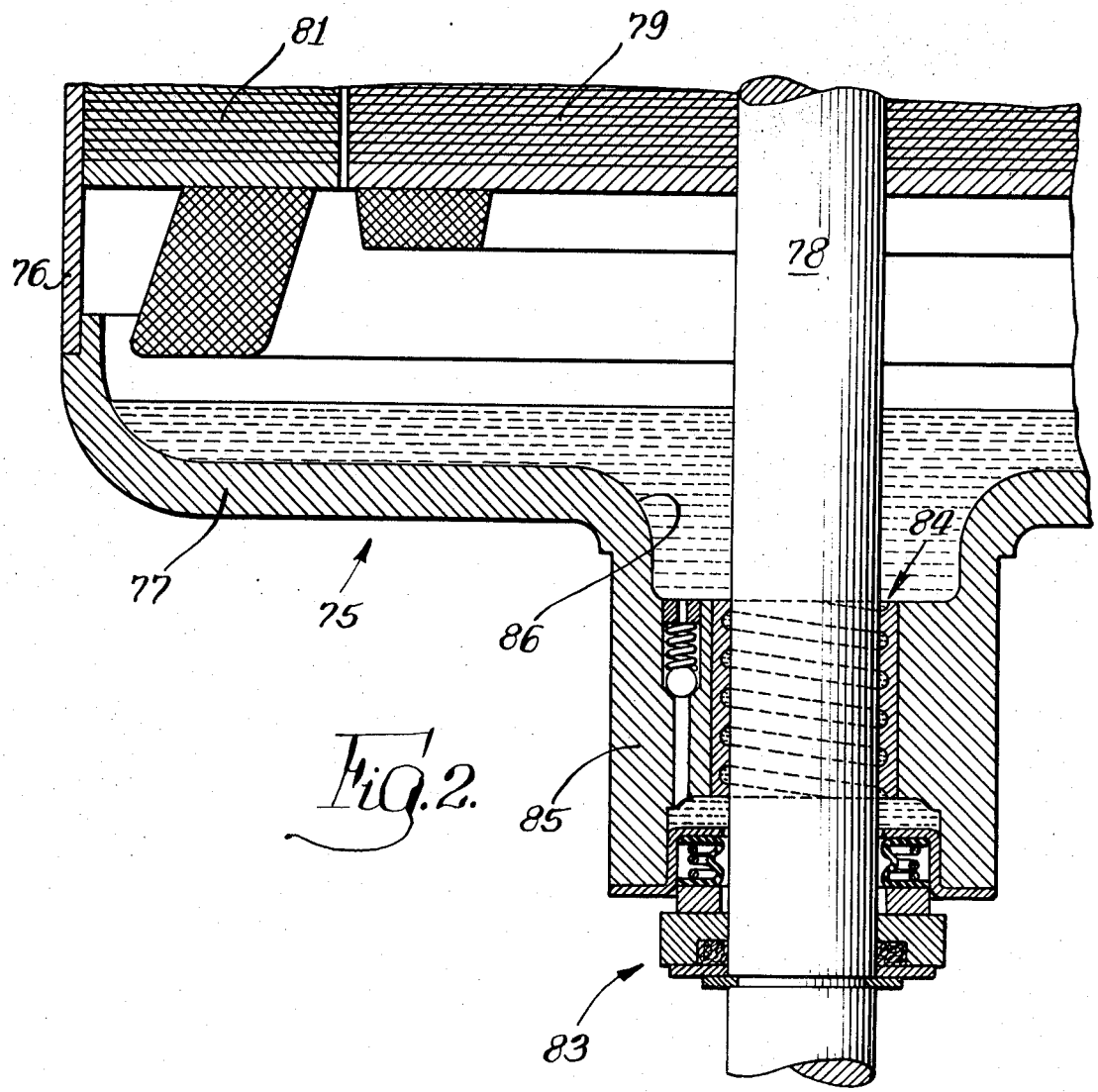
FIG. 2 is a fragmentary enlarged sectional view generally similar to a portion of FIG. 1 but showing an alternative form of the invention.

Another motor, generally similar to the motor illustrated in FIG. 1, is shown in FIG. 2, and comprises a housing 75 having a shell 76 and lower end member 77, a shaft 78, a rotor 79, a stator 81, a seal 83 and a pump 84. The lower end member 77 has a hub 85 which does not extend upwardly within the lower end member as does the portion 29 of the hub 26 of the lower end member 12. In the lower end member 77 there is formed a reservoir 86 which, unlike reservoir 59, can be entirely emptied by the pump 84 by forcing all of the lubricant in the reservoir out through the seal 83.

Still another electric motor assembly is illustrated in FIG. 3 and comprises an enclosure or housing 90, which includes an outer cylindrical shell 91 and a lower end member 92. The upper end of the motor includes an upper end member (not shown) which encloses the top of the assembly, and the two end members and the cylindrical shell 91 are secured together to form an enclosure around the remaining parts of the motor. Such remaining parts comprise a stator 96, a rotor 99, and a rotor or drive shaft 100 positioned in a rotor cavity within the stator 96. The rotor shaft 100 is rotatably supported on the upper and lower end members by upper and lower ball bearings, only the lower bearing 102 being illustrated.

A hub 105 forms a sump 106 and a chamber 107 which is open as illustrated at 108, and the shaft 100 extends downwardly through the hub 105 and out of the opening 108. The lower ball bearing 102 is fastened to an upwardly extending portion 109 of the hub 105, the outer race of the bearing 102 being supported in a groove 103 formed in the upward extending portion 109. The inner race of the ball bearing 102 is mounted on the shaft 100 in engagement with a shoulder 110 formed on the shaft. Thus, the ball bearing 102 serves both as a rotary bearing and as a support for the weight of the shaft 100 and the other parts of the rotor. The interior of the enclosure 90 is connected to the chamber 107 in the hub 105 by a passage 112 so that liquid in the interior of the end member 92 will drain into the chamber 107.

The motor has a shaft seal 111 and a purge pump 113 to prevent leakage of the liquid above the sump 106 into the interior of the motor housing through the opening 108 of the hub 105 around the shaft 100. With reference to FIG. 5, the rotating shaft seal 111 comprises a ring-shaped rotating part 116 and a ring-shaped non-rotating part 117. The rotating part 116 is mounted on the rotor shaft 100 and is driven thereby. An O-ring 118 located in a groove 119 formed in the inner periphery of the part 116 forms a seal between the part 116 and the shaft 100 and a snap ring 120 mounted in a groove 122 formed in the shaft 100 below the part 116 prevents downward movement of the rotating part 116. The support 123 extends through an opening 124 in the non-rotating part 117, then upwardly around the shaft 100, then radially outward towards the hub 105, then downwardly with a press fit within the hub 105, and then radially outward to abut the end face of the hub. A tubular flexible member 126 is provided having ends which are turned radially outward and are sealingly engaged with the support 123 and the non-rotating part 117. A compression spring 127 is located between the turned ends of the member 126, holding the ends in sealing relation with the non-rotating part 117 and the support 123, as well as pressing the non-rotating part 117 and rotating part 116 sealingly together.

As will be discussed more fully hereinafter, leakage may occur between a face 128 of the part 116 and an annular face 129 of downwardly extending flange of the part 117, particularly when the motor is running, and such leakage accumulates above the seal 111 in the sump 106 within the hub 105.

The purge pump 113 is provided to prevent leakage accumulated in the sump 106. In the form of the invention illustrated in FIGS. 3 to 5, the pump 113 is a viscosity type pump and includes a pump member 113 molded from an elastic material such as rubber or plastic. The pump member 130 includes a tubular collar portion 131 which fits closely around the shaft 100 above the seal 111, a radially extending portion 132 at the upper end of the collar portion 131, and a sealing portion 133 which extends downwardly from the radially extending portion 132. The sealing portion 133 forms a flexible lip which engages the inner periphery of the hub 105, and its inherent resiliency holds the sealing portion 133 tightly against the hub 105 with sufficient force to prevent the pump member 130 from turning with the shaft 100 and to form a seal between the hub 105 and the pump member 130.

The pumping action of the pump 113 is due to spiral grooves 135 which, in the present instance, are formed on the inner surface of the collar portion 131. AS shown in FIGS. 4 and 5, four separate grooves 135, similar to multiple threads, are formed in the collar portion 131, each of the grooves 135 opening into the space above the pump 113 as indicated at 136 in FIGS. 4 and 5 and also opening into the space below the pump. Rotation of the shaft 100 in the clockwise direction as seen in FIG. 4 relative to the pump member 130 results in any liquid above the pump being drawn into the openings 136 and being pumped downwardly into the sump 106.

When, during operation of the pump, a pumping pressure is developed in liquid in the sump 106, the pressure acts against the inner surface of the sealing portion 133 and presses it more tightly against the hub 105, and against the outer surface of the collar portion 131 and presses it against the shaft 100. Consequently, the effectiveness of the sealing portion 133 increases as the pumping pressure increases, and the pressure on the collar portion 131 increases the effectiveness of the pumping action.

Considering the operation of the structure illustrated in FIGS. 3 to 5, initially, unlike the motor shown in FIG. 1, no liquid is present in the sump 106, and the shaft 100 simply rotates in the purge pump member 130. It is therefore important that a type of purge pump be used, which will not be harmed by operation in the absence of a liquid. As previously mentioned, the motor is designed for use with the lower end portion thereof partially or entirely submersed in liquid, and in the event some of the surrounding liquid leaks into the interior of the enclosure between the faces 128 and 129 of the seal 111, such leakage gradually rises in the sump 106. The liquid may also rise in the grooves 135 to a level which is intermediate the upper and lower surfaces of the pump 130, and rotation of the shaft 100 upon energization of the motor causes such liquid to be pumped downwardly. The pressure due to the pumping action on the liquid in the sump 106 below the pump 113 increases the effectiveness of the sealing portion 133 as previously described. Such pressure on the liquid in a space 137 formed by the downwardly extending flange of the part 117 counteracts the pressure of the external liquid and thus prevents further leakage.

In the event leakage were to rise above the top of the purge pump 113 when the motor is not running, the pump 113 upon starting the motor will purge or expel accumulated liquid outwardly between the faces 128 and 129. The pump used should therefore be capable of developing greater pressure than the pressure of the liquid external of the seal. The pump pressure is transmitted to the liquid in the space 137, and this pressure tends to separate the parts 116 and 117 against the action of the spring 127 and the pressure of the liquid outside the seal 111. Thus, the pumping pressure tends to reduce the pressure between the faces 128 and 129 and enables flow of liquid from the space 137 outwardly between the faces 128 and 129 until the level of the liquid in the sump 106 drops and the pumping pressure drops. This results in the spring 127 and the external liquid forcing the two faces 128 and 129 tightly together again. It will be apparent therefore that the seal 111 is more effective in preventing leakage into the enclosure than it is in preventing flow out of the enclosure. In the event it is undesirable to force liquid outwardly through the seal, a one-way check valve may be provided through the wall of the hub between the purge pump and the seal, to enable expulsion of liquid out of the sump.

The seal 111 may be designed such that it is more resistant to flow in one direction than in the other direction, or is equally balanced. This may be accomplished in the type of seal shown in FIG. 5 by changing the amount of radially extending surface of the part 117, which is exposed to the pressure of the liquid within the space 137. It will be noted that this pressure opposes the force of the spring 127.

In FIGS. 6, 7 and 8 is illustrated another embodiment of viscosity pump, indicated at 140, which comprises a pump member having a collar portion 142 and an upward extended portion 143 located on a shaft 147. The collar portion 142 has formed therein a groove 146 for pumping liquid. The collar 142 and the shaft 147 are spaced apart as is indicated at 148, the collar portion 142 having a diametral clearance with the shaft 147 generally of 0.0005 inches or less. Thus, no wearing of the collar portion 142 or the shaft 147 will occur when the pump is running dry. The extended portion 143 has an enlarged bore 149 in which bearing means in the form of a self-lubricated bearing 150 is secured. The bearing 150 closely fits the shaft 147 and prevents the collar portion 142 from contacting the shaft. The bearing 150 is free running since its sole function is to position the collar portion 142 concentrically with the shaft 147. The bearing 150 is supported in a hub 151 by an O-ring 152 positioned in a groove 153 formed in the collar portion 142, and the extended portion 143 abuts a shoulder 154 formed in the hub 151. The shoulder 154 absorbs any upward thrust resulting from the pumping action. The O-ring 152 seals the space between the pump member and hub 151. Any liquid collected in a lower end member 156 of the motor flows to the pump 140 through a passage 158 and a passage 160 formed in the hub 151, through a radial opening 162 formed in the extended portion 143 and bearing 150 and to the upper opening of the groove 146 of the pump. The opening 162 also prevents the suction created by the groove 146 of the pump from drawing lubricant downwardly out of the bearing 150.

The operation of the pump 140 is otherwise similar to the operation of the pump 113 of FIG. 5, heretofore described.

FIGS. 9 through 12 illustrate yet another embodiment of a purge pump and yet another form of seal. Other parts of the motor assembly include a hub 165 extending downwardly from a lower end member, a drive or rotor shaft 166 and a bearing 167 mounted in the hub 165, which are similar to the corresponding parts illustrated in FIGS. 3 to 5.

With reference to FIG. 11, the assembly includes a seal 168 comprising a ring-shaped holder 169 which is positioned around the lower end portion of the rotor shaft 166 and contains a seal member 173. The holder 169 is positioned in a counterbore 171 formed in the lower end of the hub 165 and is sealed to the hub 165. The seal member 173 is fastened in an annular groove 174 formed in the underside of the holder 169 at its inner edge, the member 173 having a downwardly extending resilient lip 175 formed on its inner periphery, which slidingly engages the surface of the shaft 166. The inherent resiliency of the lip 175 holds it against the shaft 166 to effect sealing. The pressure of a liquid exterior of the motor forces the lip 175 tightly against the shaft 166 and thereby increases the effectiveness of the seal. However, the pressure of a liquid in a sump 176 formed by the interior of the hub 165 above the seal tends to flex the lip 175 radially outwardly. Consequently, the lip 175 is more effective in sealing against the entrance of liquid from the outside of the motor to the inside than it is in sealing against leakage from the inside to the outside of the motor.

A vane pump 178 is also provided comprising an upper or intake part 179, a lower or outlet part 181, and a sliding vane 182. The pump 178 is located in the sump 176 above the seal 168, and the two parts 179 and 181 are secured to each other as by pins (not shown) and fit within the inner periphery of the hub 165. An O-ring 183 positioned in an annular groove 184 formed on the outer surface of the outlet part 181 prevents leakage of liquid between the pump 178 and the hub 165 and between the two parts 179 and 181 of the pump.

Both the intake part 179 and the outlet part 181 are ring-shaped and are positioned closely around the rotor shaft 166. The intake part 179 has an eccentric opening 186 (FIG. 12), the opening 186 being circular but larger than the shaft 166 and having its center displaced from the axis of the rotor shaft 166 to form a pump cavity indicated by the numeral 187 (FIG. 12). A radially extending slot 188 is formed through the rotor shaft 166 at the level of the eccentric opening 186, and the vane 182 extends through the slot 188. As shown in FIGS. 11 and 12, the length of the vane 182 is slightly shorter than the diameter of the eccentric opening 186, so the vane 182 will not jam as the shaft 166 rotates. Due to the eccentricity of the opening 186, the vane 182 slides radially with respect to the shaft 166 in the slot 188 as the rotor shaft 166 and the vane 182 rotate relative to the two parts 179 and 181.

The intake part 179 has an axially extending intake opening 191 (FIGS. 10 and 11) formed therein which leads from the space above the pump to the eccentric opening 186. The outlet part 181 has an outlet opening 192 formed therein which extends axially from the eccentric opening 186 to the sump 176 below the pump. As shown in FIG. 10, the intake and outlet openings 191 and 192 are displaced by an angle of approximately 110° and are located on opposite sides of the portion of the opening 186, which is closest to the surface of the shaft 166. As the shaft 166 and the vane 182 rotate, the ends of the vane 182 sweep past the intake opening 191, through the pump cavity 187, to the outlet opening 192.

Considering the operation of the structure shown in FIGS. 9 and 12, again assume that liquid has leaked past the seal 168 and has risen to a level which is slightly above the upper surface of the intake part 179 of the pump 178. Upon rotation of the rotor shaft 166, the vane 182 will turn with the rotor shaft 166. Rotation of the vane causes liquid from above the pump to be drawn into the opening 186 through the intake 191, forced through the cavity 187 by the vane 182, and out of the outlet opening 192. Liquid pressure will be developed in the sump 176, and such pressure will counteract the pressure of external liquid tending to leak into the enclosure to prevent further leakage. The pressure will also tend to deflect the lip 175 radially outwardly to permit flow of the liquid from the sump 176 to the exterior of the motor when the internal pressure is greater than the external pressure.

From the foregoing, it will be apparent that a novel and useful structure has been provided for controlling leakage into a motor enclosure. Liquid is contained in a sump which is closed by a seal at the lower end of the motor enclosure. The purge pump is located within the sump above the seal and exerts pressure on such liquid downwardly during energization of the motor. The purge pump develops sufficient pressure on the liquid in the sump to counteract the pressure of external liquid tending to leak into the enclosure, and may expel some of the liquid or accumulated leakage through the seal. The viscosity and the vane pumps disclosed herein may be inexpensively manufactured and readily installed on a motor shaft, and they develop a sufficient head of pressure to prevent excessive leakage into the enclosure.

I claim:

1. An electric motor assembly for operation at a location where external liquid would tend to enter the motor, comprising an enclosure, motor parts including a generally vertical drive shaft member mounted in said enclosure, said enclosure having an opening formed in the lower end thereof and said drive shaft extending downwardly out of said enclosure through said opening, a seal between said shaft and said enclosure at said opening, said enclosure being adapted to contain liquid above said seal, and pump means driven by said shaft and mounted within said enclosure above said seal for exerting pressure on liquid above said seal, said pressure preventing leakage inwardly through said seal into said enclosure, said seal being more resistant to flow of liquid into said enclosure than flow of liquid from said enclosure.

2. Apparatus as in claim 1, wherein the liquid above said seal is lubricant, said pump means is mounted within said enclosure to receive said lubricant.

3. Apparatus as in claim 1, wherein the liquid above said seal is external liquid leaking through said seal into said enclosure and accumulating above said seal, said pump means is mounted in said enclosure to receive said leakage.

4. Apparatus as in claim 1, wherein said pump means comprises said shaft member and a tubular member, one of said members having at least one groove for pumping liquid.

5. Apparatus as in claim 1, wherein said pump means further includes bearing means for said shaft member.

6. Apparatus as in claim 8, wherein said bearing means has at least one groove cooperating with said shaft member to pump liquid.

7. An electric motor assembly for operating at a location where external liquid would tend to enter the motor, comprising an enclosure, motor parts including a generally vertical drive shaft member mounted in said enclosure, said enclosure having an opening formed therein and said drive shaft extending out of said enclosure through said opening, a seal between said shaft and said enclosure at said opening, said enclosure being adapted to contain liquid above said seal, and pump means mounted within said enclosure above said seal for exerting pressure on liquid above said seal, said pressure preventing leakage inwardly through said seal into said enclosure, said pump means further comprising a vane slidable in said shaft member.

8. An electric motor apparatus for operation at a location where external liquid would tend to enter the motor, comprising an enclosure, motor parts including a generally vertical drive shaft mounted in said enclosure, said enclosure having an opening at its lower end and said drive shaft extending downwardly out of said enclosure through said opening, a seal located in said opening around said shaft, and pump means mounted within said enclosure above said seal and driven by said drive shaft, said enclosure containing lubricant to a level above said pump means, said pump means increasing the pressure of said lubricant in the space above said seal and below said pump means for preventing leakage of external liquid through said seal into said enclosure.

9. Apparatus as in claim 11, further, further comprising a one-way valve adapted to open at a predetermined pressure, said pump means having inlet and outlet sides, said one-way valve when opened permitting flow from said outlet side to said inlet side.

10. Means for controlling leakage of an external liquid into the interior of an enclosure for a mechanism having a rotating drive shaft, said enclosure having an opening formed therethrough and said shaft extending out of said enclosure through said opening, said control means comprising a seal mounted in said opening around said shaft, and a pump positioned within said enclosure adjacent said seal, said pump being adapted to be operated by rotation of said drive shaft, and to pressurize liquid between said seal and said pump and thereby counteract the pressure of external liquid tending to leak through said seal, said pump comprising a housing adapted to be positioned around said shaft, said housing having an eccentric cavity formed therein and intake and outlet openings leading to and from said cavity, said shaft having a slot extending diametrically therethrough, and a vane adapted to extend through said slot, said vane rotating in said cavity upon rotation of said shaft and forcing liquid from said intake opening, through said cavity, and out of said outlet opening.

11. An electric motor assembly for operation at a location where external liquid would tend to enter the motor, comprising an enclosure, motor parts including a generally vertical drive shaft member mounted in said enclosure, said enclosure having an opening formed therein and said drive shaft extending out of said enclosure through said opening, a seal extending out of said enclosure through said opening, said enclosure being adapted to contain liquid above said seal, and combination bearing-pump means mounted within the lower end of said enclosure above said seal for both supporting the lower end of said shaft and for exerting pressure on any liquid above said seal, said pressure preventing leakage inwardly through said seal into said enclosure.

12. An electric motor assembly for operation at a location where external liquid would tend to enter the motor, comprising a housing, motor parts including a generally vertical drive shaft mounted in said housing, said housing having an opening at its lower end and said drive shaft extending downwardly out of said housing through said opening, a seal located in said opening around said shaft and pump means mounted within said housing above said seal and connected to be driven by said drive shaft, said housing, said pump means and said seal forming an enclosed space adjacent the lower end of said housing, said housing being adapted to contain a liquid to or above the level of said pump means, said liquid filling said enclosed space, and said pump means exerting pressure on said liquid during operation of said motor, such pressure preventing leakage of external liquid through said seal into said housing.

13. an assembly as in claim 13, wherein said housing forms a sump at the lower end thereof, said pump means being located in said sump and said liquid filling said sump.

14. An assembly as in claim 12, wherein said liquid is a lubricant.

* * * * *

PO-1050
(5/69)

UNITED STATES PATENT OFFICE
CERTIFICATE OF CORRECTION

Patent No. 3,688,140          Dated 8/29/72

Inventor(s) Edward J. Schaefer

It is certified that error appears in the above-identified patent and that said Letters Patent are hereby corrected as shown below:

IN THE SPECIFICATION
Column 1, line 60, delete "one";
Column 1, line 61, "enlarges" should read --enlarged--;
Column 6, line 6, "member 113" should read --member 130--;
Column 6, line 23, "AS" should read --As--;
IN THE CLAIMS:
Column 10, line 43, delete "further,"
Column 11, line 7 and 8, "extending out of said enclosure through" should read --between said shaft and said enclosure at--;
Column 12, line 13, "an" should read --An--.

Signed and sealed this 15th day of May 1973.

(SEAL)
Attest:

EDWARD M. FLETCHER, JR.          ROBERT GOTTSCHALK
Attesting Officer                 Commissioner of Patents